May 29, 1956

D. S. JOHNSTON 2,748,358

COMBINATION OIL WELL TUBING AND
ELECTRICAL CABLE CONSTRUCTION

Filed Jan. 8, 1952

INVENTOR.
DANIEL S. JOHNSTON
BY
Philip Subkow
ATTORNEY.

May 29, 1956
D. S. JOHNSTON
2,748,358
COMBINATION OIL WELL TUBING AND
ELECTRICAL CABLE CONSTRUCTION
Filed Jan. 8, 1952
4 Sheets-Sheet 2
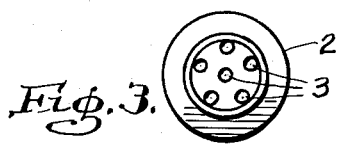
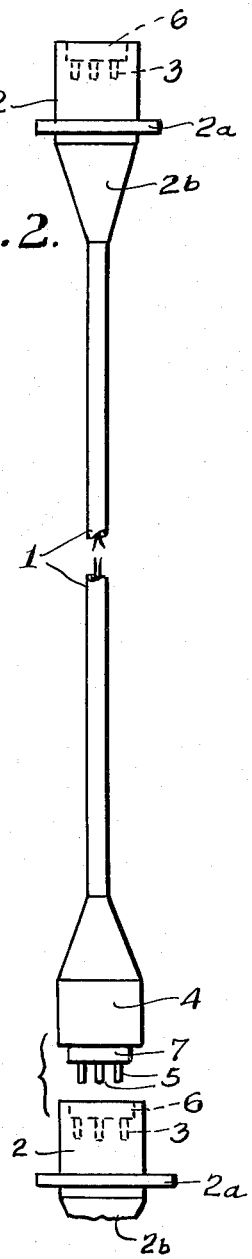
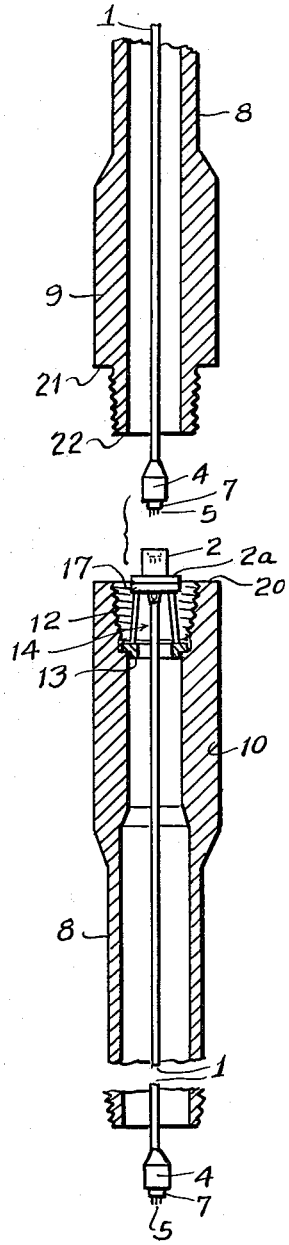
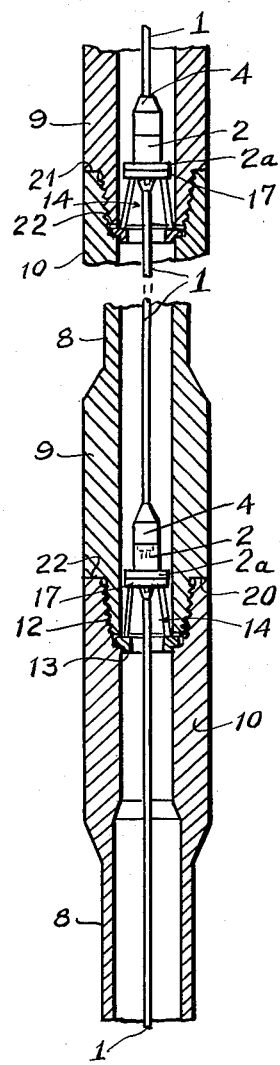
INVENTOR.
DANIEL S. JOHNSTON
BY
ATTORNEY.

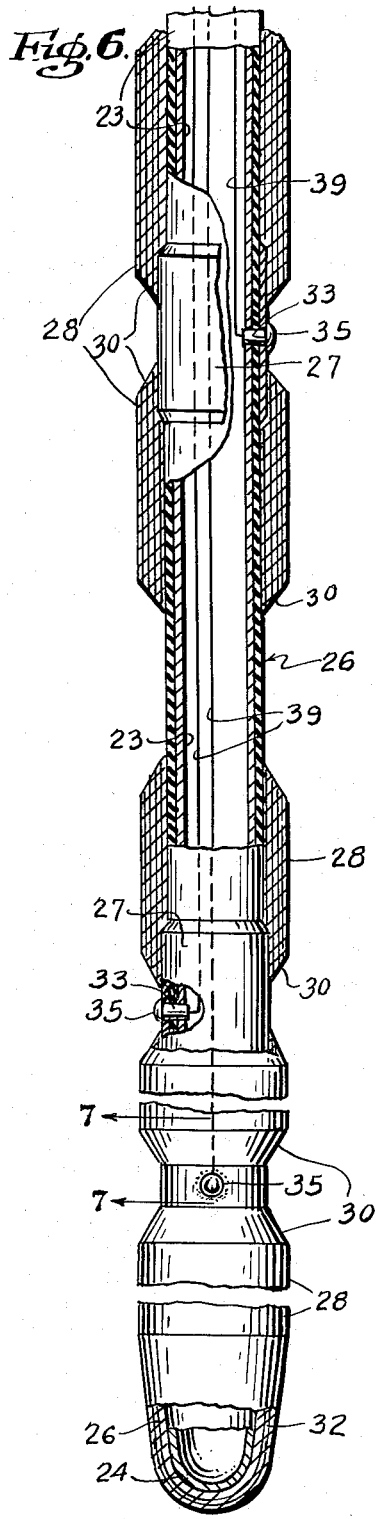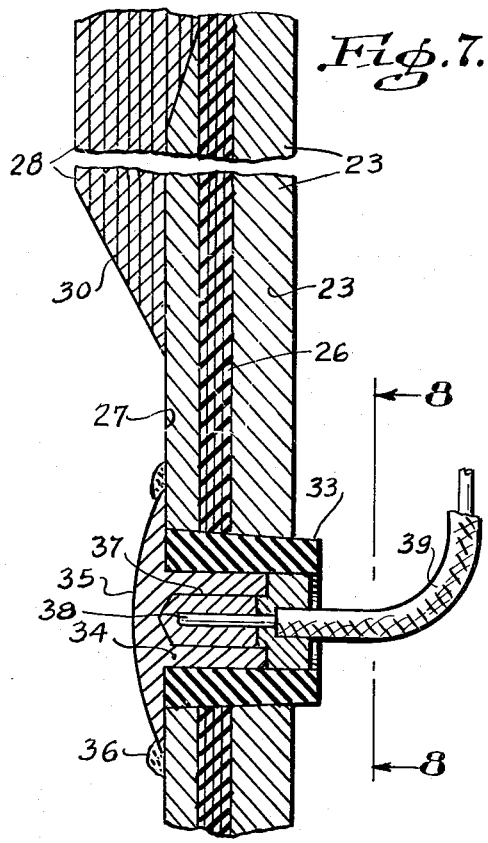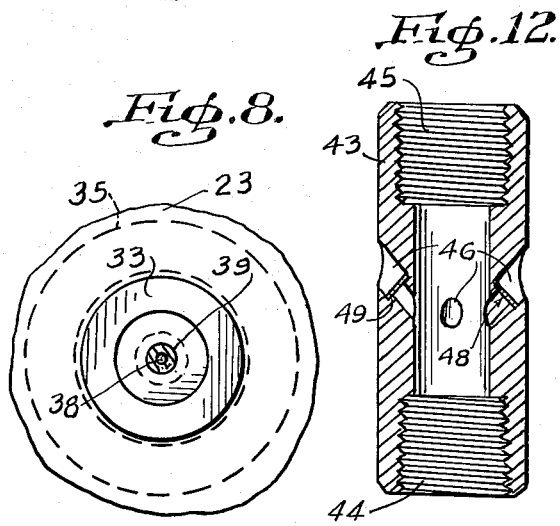

May 29, 1956
D. S. JOHNSTON
2,748,358
COMBINATION OIL WELL TUBING AND
ELECTRICAL CABLE CONSTRUCTION
Filed Jan. 8, 1952
4 Sheets-Sheet 4
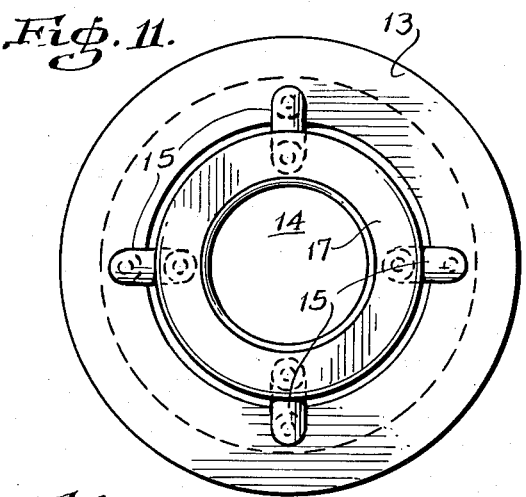
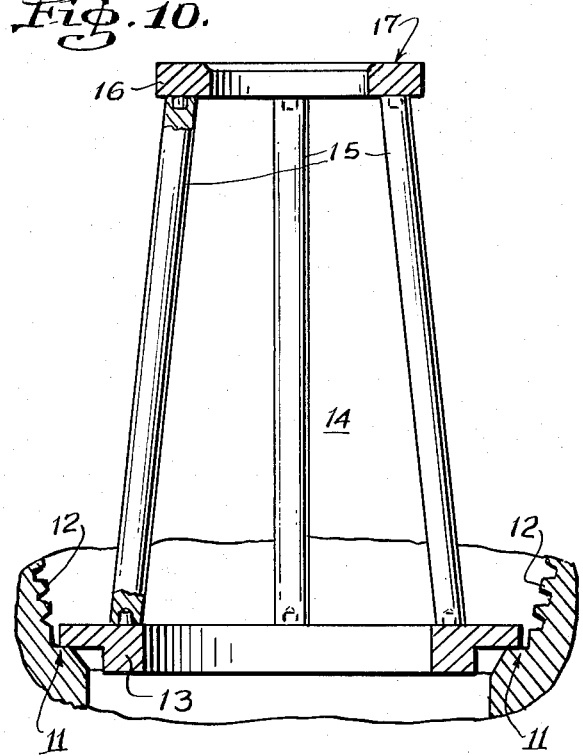
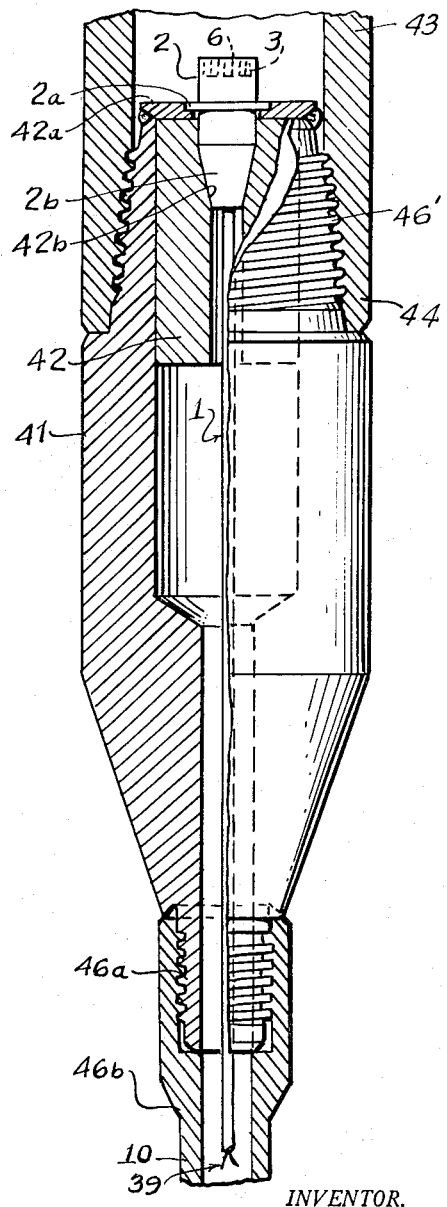
INVENTOR.
DANIEL S. JOHNSTON
BY
ATTORNEY.

United States Patent Office 2,748,358
Patented May 29, 1956

2,748,358

COMBINATION OIL WELL TUBING AND ELECTRICAL CABLE CONSTRUCTION

Daniel S. Johnston, Rolling Hills, Calif., assignor to Signal Oil and Gas Company, Los Angeles, Calif., a corporation of Delaware Application January 8, 1952, Serial No. 265,424

5 Claims. (Cl. 339—16)

My invention relates to a cable and pipe construction useful for use in bore holes such as oil wells, as, for example, for connecting electrical apparatus in the bore hole to the surface. Electric motors may be lowered to the bottom of a bore hole to operate a pump or to rotate a drill, or electrical measuring devices are lowered into a well to measure a characteristic of the environment around or in a bore hole. For example, in electrical logging, electrodes are lowered into a bore hole and the electrical characteristics of the formation are determined. This procedure is so conventional that further description will be unnecessary for those skilled in this art. In addition, many other instruments and devices are lowered into wells which require that electrical conduits be lowered into the bore hole.

In such circumstances it is desirable that the electrical conduits be electrically insulated. In vertical wells the conduits are readily lowered since they hang straight, due to the weight of the instrument attached to the end of the line. However, if the lines be long as, for example, in deep bore holes, the weight of the cable may be sufficient to part the cable or strip the metallic wire from the electric insulation.

In directional wells which are inclined to the vertical up to 60° to 70°, it is not feasible to lower the cable under the influence of gravity, since a point is soon reached where the instrument and conduit lie on the low side of the bore and friction prevents the line from descending further. Additionally, the conduits, in being lowered, rub on the side of the bore hole and the insulation wears away.

In order to overcome these difficulties, I desire to employ the expedient of mounting the electrical conduit inside pipe which may be introduced into the bore hole. The weight of the pipe and, if necessary, jacks to shove the pipe, may be employed to force the conduit into the bore hole to overcome the frictional resistance of the pipe against the inclined bore hole.

By mounting the electrical cable inside the pipe I avoid any abrasive action of the wall of the bore as the pipe carrying the electrical cable is pushed into the bore hole. If the cable be mounted on the outside of the pipe, the insulation would be soon stripped from the cable.

Since it is desired and, indeed, necessary, to make the pipe sectional and, as I have found, it is desirable to support the cable inside the pipe, I have developed a novel and very practical means of supporting the cable inside the pipe and to make necessary connections of the cable lengths at the pipe joints.

While this method of running electrical cable into bore holes has many utilities, one which I have found particularly useful is in connection with operation of electrical logging equipment.

These and other objects of my invention will appear from the further description of the invention taken together with the drawings, in which Fig. 1 is a schematic assembly, showing the connection to the cable and the electrical device suspended in the bore hole;

Fig. 2 is a plan view of a cable section;

Fig. 3 is a top plan view of Fig. 2;

Fig. 4 is a sectional fragmentary view, showing the means for supporting the cable in the pipe and the pipe prior to assembly;

Fig. 5 shows the pipe assembled and the cable made up;

Fig. 6 is a fragmentary sectional view of the electrode;

Fig. 7 is a detail of Fig. 6;

Fig. 8 is a view taken on line 8—8 of Fig. 7;

Fig. 9 is a view in part section and parts broken away showing the adapter;

Fig. 10 is a view in part section and parts broken away showing the spider for supporting the cable at the joints;

Fig. 11 is a plan view of Fig. 10, showing the spider in position; and

Fig. 12 is a sectional view of the circulation sub employed.

Figure 1:
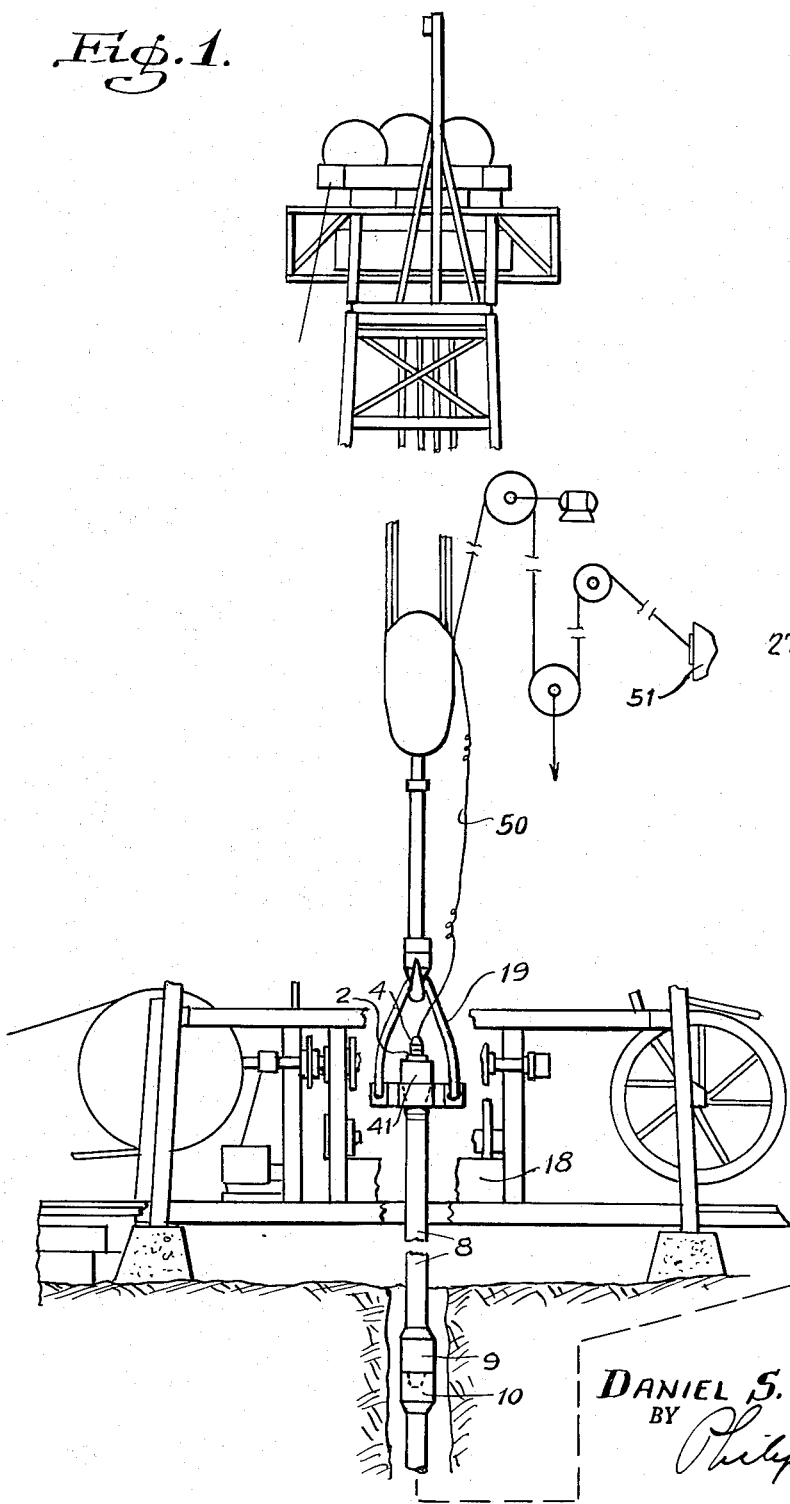

The electrical conductor is illustrated in Figs. 2 and 3. It may be of ordinary single or multiple strand electrical cable 1, suitably insulated by rubber, neoprene, or other type of insulation, as is conventional for electrical insulation of cables. It is of a length somewhat longer than the length of a stand of pipe employed, as will be explained below. As illustrated in Figs. 2 and 3, it is shown as containing six conductors. At one end of the cable is a female push-type plug having sockets 3 in a counterbore 6. The female plug has a conical end 2b and an intermediate flange 2a. At the other end of the cable is a male push-type plug 4, carrying prongs 5 which may be pushed into the sockets 3 of another cable section. The prongs protrude from a boss 7 which fits into a counterbore 6 of the female plug.

The cable female and male plugs are commercially available and of themselves form no part of the invention, except that because of their construction the plugs are fluid-tight up to a very high pressure and they are particularly suited in the structure of my invention. This is because the plugs are molded of rubber in one integral unit and the rubber boss makes a pressure-tight fit when it is pressed into the counterbore 6.

A form which I have found useful is the "water seal" plug sold by the Joy Manufacturing Co. and described and illustrated in this specification.

I mount each such length of cable in a stand of pipe. As is conventional in oil well operation, pipe is inserted in an oil well in sections called stands. Such sections are illustrated in Figs. 4 and 5. These stands terminate in couplings, one form of which is illustrated in Figs. 4 and 5. Thus, at one end is a pin and at the other end of the stand is a box 10. The pipe joint is made up by screwing the pin 9 into the box. Such a joint when used on drill pipe is also termed a tool joint.

I mount the cable section in the pipe by suspending it in a spider which is positioned in either the box or pin. However, it is conventional in oil well practice to make up, i. e., assemble, pipe as it enters the well by screwing the pin into the box, i. e., enter the pin end first into the well. I therefore suspend the cable in the box end of the pipe.

I accomplish this by cutting a square shoulder 11 (see Figs. 4, 5, and 10) into the end of the box and at the inner end of the internal thread 12. I may, however, employ the taper shoulder present in standard A. P. I. tool joints at the base of the threaded portion of the box section as the seat for the spider.

The lower ring 13 of a spider 14 is set loosely on the shoulder 11. The spider has three inwardly inclined legs 15 upon which is mounted the upper ring 16. The outer diameter of the ring 16 is less than the inner diameter of the pin end, and the height of the spider is such that the upper surface of the spider is near and preferably somewhat above the end of the box 10, so that the top of the spider protrudes above the end of the box. The spider is thus positioned in the threaded end of the box. The trapezoidal construction of the spider permits the pin end of the tool joint to pass over the spider with the spider housed within the central bore of the pin. The female plug 2 is positioned in the spider with the intermediate flange 2a on the seat 17 of the ring 16. The top of the female plug element 2 protrudes above the box with cable hanging free and the male plug hanging outside and below the pin end at the other end of the stand by a short length of cable, for example, 6", or so, for the purpose to be described below. By this expedient I can use standard drill pipe and tool joints and do not need to materially modify the pipe or tool joint for supporting the cable.

In making up the pipe, the cable is mounted in each stand of pipe in the manner described, and with the box end protruding out of the bore hole; for example, in the slips of the rotary table 18 (see Fig. 1). The next stand is hung in the elevator 19, whereupon the male plug hangs below the pin end. This is conventional procedure in making up ordinary drill pipe. It may then be entered into the female plug positioned in the box of the stand in the slips by pushing the male prongs into the female sockets 3 and the stand in the elevator is then lowered so that the pin may be screwed into the box. The method of screwing pipe together described below is conventional procedure, the novel step being the connecting of the plugs as described above. The slack of the cable is accommodated inside the pin and permits the stands to be screwed together without introducing an undesirable twist into the cable or the cable connector.

The pin end 22, when the box end 20 abuts the shoulder 21 of the pin, is adjacent or even may clamp the ring 13 in place, and acts to prevent the spider from being displaced.

It will be observed that the cable is supported at each joint so that the weight of the cable suspended at each plug is limited. The weight of the copper or other metal wire forming the electrical conductor is transmitted at each joint through the plug, to the spider, and thus to the pipe. The only load on the cable between each joint is the weight of the cable between each joint.

While the cable as illustrated has many uses, that is, for every purpose in which either an electrical or other type of wire or other conduit is required, its utility and the manner of use will be illustrated by reference to its use with an electrode to be used in the conventional electrical logging of bore holes and invented by James Moon, and forming the subject matter of a co-pending application Serial No. 265,458, filed January 8, 1952.

The electrode is made up of a steel pipe 23 which is closed at one end by a bull plug 24. It is coated by an insulating layer 26 made up of glass fiber cloth which is saturated with a plastic; for example, a polyester resin, throughout its length. Spaced along its length are a number of (in this case six) bands 27 of metal (for example, zinc) which may be deposited by spraying the molten metal on the fiber glass layer 26.

Several strips of resin impregnated fiber glass are wound on both sides of each metal band, so that they overlap the metal band on each side, as is shown in Fig. 7. The strips are trapezoidal so that when they are wound they produce a beveled edge 30. The several layers build up a thickness so that a wear collar is produced on each side of the metal strip. Like wear collars are also wound at 29 at spaced points along the electrode length over the resin impregnated glass fiber surface 26 which extends the full length of the electrode over the entire length of the pipe 23. The bull plug end is also coated by a layer of the resin-impregnated glass fiber 26 and the external layer of protective resin-impregnated glass fiber 32.

The pipe 23, glass fiber 26, and metal band 27 are bored, and a conical sleeve 33 of neoprene or other oil resistant elastic material is placed inside the bore to make a tight fit with its outer end flush with the metal band 27. The brass rivet 34 is forced into the sleeve 33, making a tight fit with the sleeve, so that the head 35 overlies the metal band 27. It is silver soldered to the band, as shown at 36, around its periphery. The rivet is bored at 37 and the electrical conduit 39 is stripped to reveal the metal wire 38 for sufficient length to enter the bore 37. It is silver soldered into the bore 37 and the balance of the bore 37 and the balance of the sleeve 33 are filled with an insulating cement, for example, a rubber cement.

Each band is connected in like manner to an electrical conduit and the six conduits inside the pipe 23 run the full length of the electrode. At the upper end of the electrode is an adapter sub 41, having a pin end 46a which is screwed into the box end 46b of the electrode pipe (see Fig. 9). The adapter sub 41 connects the smaller diameter electrode pipe and box end to the larger diameter pipe 8 via pin 46. The wires 39 are connected to a female plug 2 positioned in a plug 42 mounted in the end of the sub. The flange 2a is set in the counterbored seat 42a and the conical end 2b is set in the conical seat 42b in the plug 42. The plug 2 is thus sealed by the female plug element especially if a static head of fluid is in the pipe above the plug 42. To permit circulation of fluid down the pipe 8 from the surface, a circulation sub 43 shown in detail in Fig. 12 is provided. As seen in Fig. 1, sub 43 is mounted between the pipe 8 and the adapter sub 41 by screwing the end 44 of sub 43 into the pin 46' of the sub 41, and the end 45 of sub 43 into the pin end of the pipe 8, with a short section of cable threaded through the stand adjacent the circulation sub, and hanging sufficiently below the pin end of the pipe 8 to be threaded through the circulation sub and to be entered into the female end 2 of the plug 42. The electrode is screwed on the pin 46a of the adapter sub 41.

The circulation sub has a plurality of ports 46 and 47 sealed by a plate 48 which is pressed into the port against the shoulder 49 and is frictionally held.

As the electrode is lowered into the bore hole the presence of the static head of fluid mud or oil in the bore hole will hold the plate 48 on its seat to seal the inside of the electrode from contamination. The plug 3 in the adapter sub 41 seals the interior of the electrode from fluid which may be in the pipe above the sub. If it is desired to circulate fluid down the pipe 8, this may be done by disconnecting the cable 50 from the plug in the stand in the elevator 19 and mounting a grief stem or kelly on the top stand, as is conventional. Mud then may be circulated down the kelly and pipe, as is conventional in oil well drilling. The mud passes the spiders 15 through and around the rings 13 and 16, and the pressure being sufficient will force the plates 48 from their seats, establishing circulation down the pipe 8 and back to the surface. The electrode, however, will remain sealed by reason of the plug 42 and the sealed female plug 2 in the adapter sub.

When measurements are to be taken the circulation may be interrupted, the grief stem removed, and the exposed end of the box on the stand positioned in the elevators 19 will reveal a plug 2 into which an electrical conduit 50 may be plugged to be carried to any place desired, as, for example, it may be hitched to the traveling block and passed over pulley to a logging truck 51.

While I have described a particular embodiment of my invention for the purpose of illustration, it should be understood that various modifications and adaptations thereof may be made within the spirit of the invention as set forth in the appended claims.

I claim:

1. In combination, a stand of pipe having an integral externally threaded tool joint pin element positioned at one end thereof and an integral internally threaded tool joint box element positioned at the other end thereof, said pin and box elements being adapted to threadingly mate directly with box and pin elements respectively of other similar stands of pipe, a flexible electrical cable section extending through said first stand of pipe, said cable having electrical coupling means comprising prong and socket connectors at each end adapted to mate with complementary coupling means of cable sections extending through said other stands of pipe, and means positioned adjacent one of said elements of said first stand supporting said first cable section adjacent one end thereof, said last mentioned means and cable section supported thereby being formed to provide a passage within the stand carrying the same to permit fluid flow throughout the length of this stand, said first cable depending with one of its connectors freely from said supporting means with its other end extending freely beyond the other of said first stand elements, whereby said extending cable section end may be united with a complementary coupling means of an end of a cable section extending through a similar axially juxtaposed stand, and the adjacent elements of the juxtaposed stands may be directly united to provide a continuous fluid conduit with independently supported cable sections therein.

2. A combination as set forth in claim 1, and wherein the cable supporting means is a spider having a flange supported upon a shoulder on said first stand of pipe, whereby the spider may be clamped in position by a cooperating abutment formed on the mating element of one of said other stands of pipe.

3. In combination, two stands of pipe, each having an integral externally threaded tool joint pin element positioned at one end thereof and an integral internally threaded tool joint box element positioned at the other end thereof, the pin and box elements of each stand being adapted to threadingly mate directly with the box and pin elements respectively of the other stand, each stand further having a flexible electrical cable section extending therethrough having electrical coupling means comprising a prong connector at one end adjacent one of said elements and a socket connector at the other end adjacent the other of said elements, the prong connector of each section being formed to unite with the socket connector of the other section, and each stand further having means positioned adjacent one of said elements supporting the cable section adjacent a first end thereof, said last mentioned means and cable section supported thereby being formed to provide a passage within the stand to permit fluid flow throughout the length of the stand, said cable section depending with one of its connectors freely from said supporting means with its second end extending freely beyond its adjacent stand element; whereby, with a pair of mating elements of said stands axially juxtaposed, the connector of one stand may be coupled with the juxtaposed connector of the other stand, and the stands then threadedly united one with the other.

4. In combination, a stand of pipe, a tool joint box element positioned on one end of said stand, said box element having an internally threaded portion, a tool joint pin element positioned at the other end of said stand, said pin element having an externally threaded portion, a spider positioned in the threaded portion of one of said tool joint elements, said spider having a plurality of inclined legs and a pair of spaced parallel rings, the ends of said legs being connected to said rings, one of said rings having an outer diameter less than the inner diameter of said tool joint elements, a flexible cable threaded through said stand, a male plug element for said cable at one end of said cable, a female plug element at the other end of said cable, one of said plug elements being positioned on the said one of said rings, the other of said plug elements extending beyond the other of said tool joint elements and positioned exteriorly of said stand.

5. In combination, a stand of pipe, a tool joint pin element positioned on one end of said stand, said pin element having an exteriorly threaded portion, a tool joint box element positioned on the other end of said stand, said box element having an internally threaded box portion and a shoulder adjacent the inner end of said internally threaded portion, a spider positioned in the threaded portion of said box element, said spider having a lower ring, a spaced parallel upper ring axially aligned with said lower ring, said upper ring having an outer diameter less than that of said lower ring and less than the inner diameter of said tool joint elements, and a plurality of inwardly inclined legs connecting said lower ring and said upper ring, said lower ring being supported on said shoulder, a flexible cable threaded through said stand, a male push type plug element mounted on one end of said cable, a female push type plug element mounted on the other end of said cable, the female plug element mounted on the upper ring of said spider, a fluid circulation passageway between said female plug element and said box element, the end of said female plug element protruding beyond the end of said box, the male plug element hanging below the end of said pin element.

References Cited in the file of this patent

UNITED STATES PATENTS

| Number | Name | Date |
|---|---|---|
| 296,547 | Flad | Apr. 8, 1884 |
| 1,592,012 | Stafford | July 13, 1926 |
| 1,930,926 | Doane | Oct. 17, 1933 |
| 1,981,460 | Miller | Nov. 20, 1934 |
| 1,994,886 | Doane | Mar. 19, 1935 |
| 2,091,597 | La Force | Aug. 31, 1937 |
| 2,096,279 | Karcher | Oct. 19, 1937 |
| 2,196,314 | Lee | Apr. 9, 1940 |
| 2,197,392 | Hawthorn | Apr. 16, 1940 |
| 2,229,211 | Korengold | Jan. 21, 1941 |
| 2,339,274 | Kothny | Jan. 18, 1944 |